2 Sheets—Sheet 2.
I. N. & R. N. CHERRY.
SELF-RAKES FOR HARVESTERS.
No. 189,605. Patented April 17, 1877.
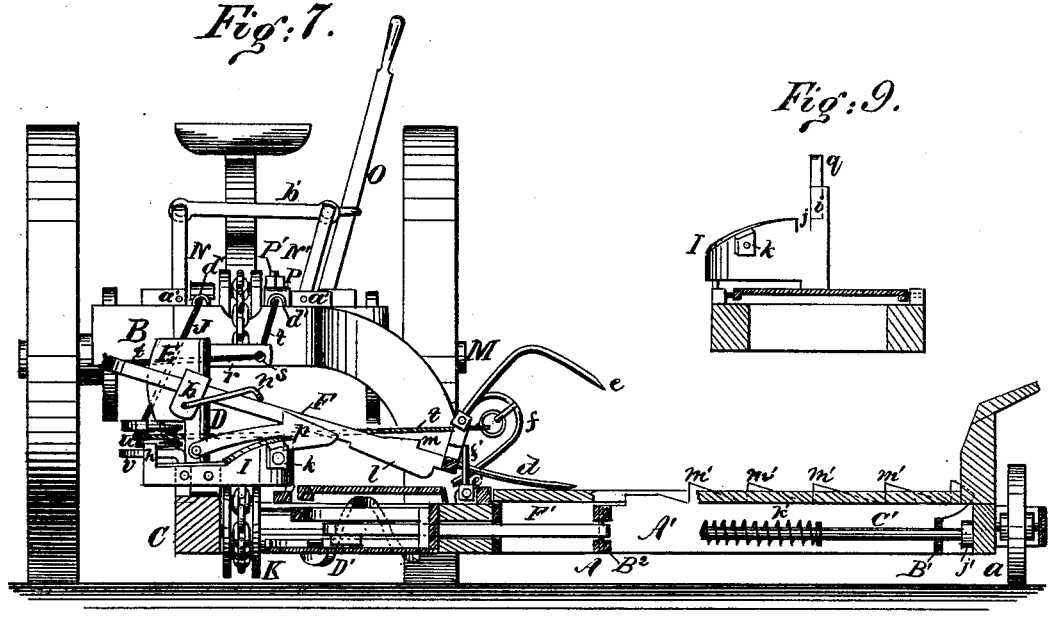
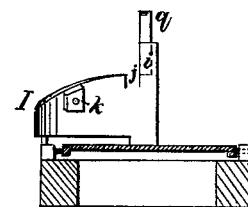
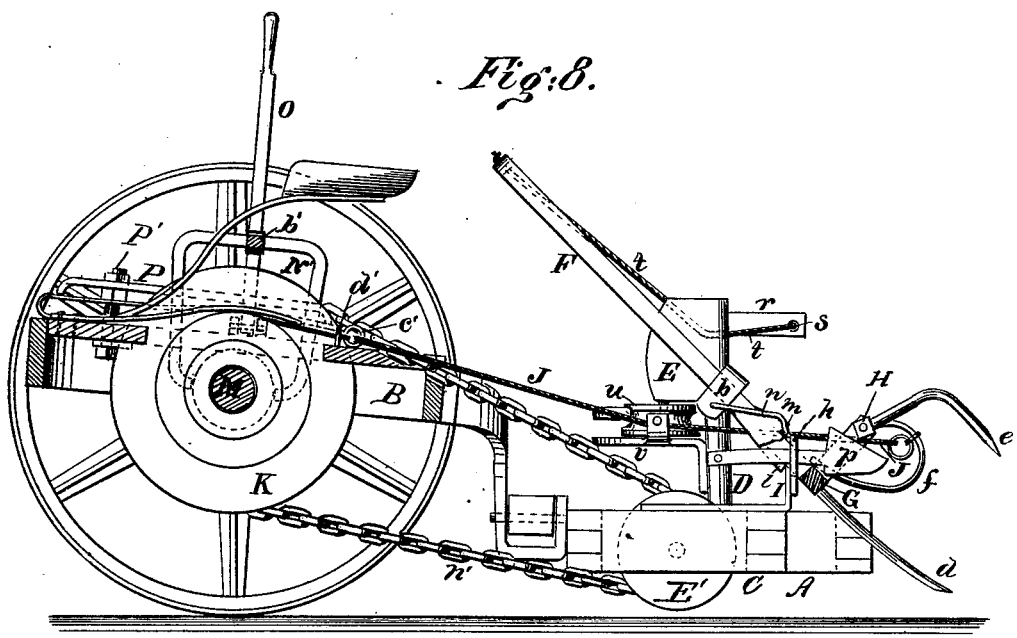
WITNESSES:
INVENTORS
R. N. Cherry
BY I. N. Cherry
ATTORNEYS.
N. PETERS, PHOTO-LITHOGRAPHER, WASHINGTON, D. C.

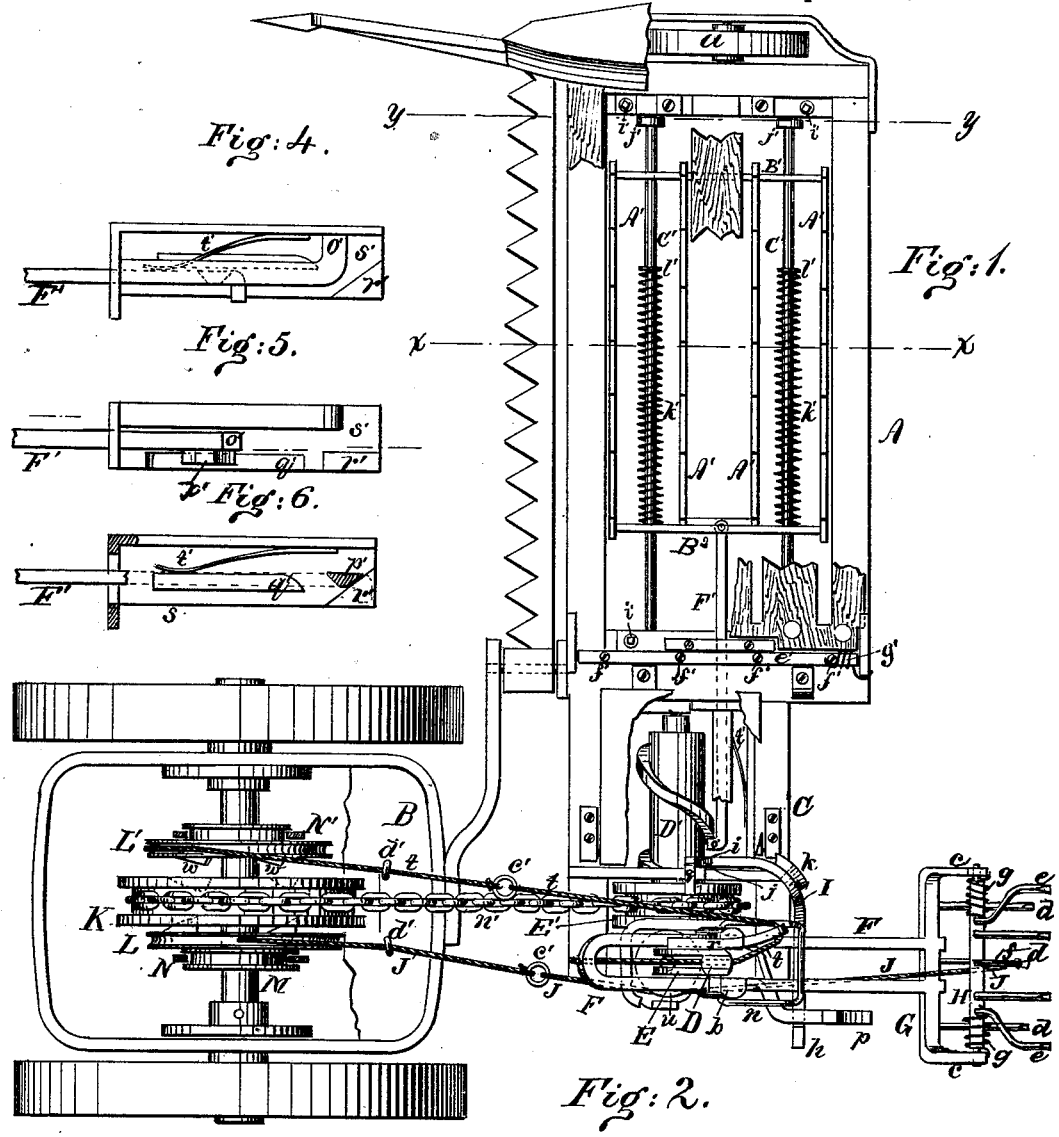

UNITED STATES PATENT OFFICE.

ISAAC N. CHERRY AND ROBERT N. CHERRY, OF JERSEY CITY, NEW JERSEY.

IMPROVEMENT IN SELF-RAKES FOR HARVESTERS.

Specification forming part of Letters Patent No. 189,605, dated April 17, 1877; application filed February 26, 1877.

*To all whom it may concern:*

Be it known that we, ISAAC N. CHERRY and ROBERT N. CHERRY, of Jersey City, in the county of Hudson and State of New Jersey, have invented a new and Improved Self-Rake for Harvesters, of which the following is a specification:

Figure 1 is a plan view, with parts broken away to show the construction more clearly. Fig. 2 is a transverse section on line $x\,x$ in Fig. 1. Fig. 3 is a transverse section on line $y\,y$ in Fig. 1. Figs. 4, 5, and 6 are detail views of a part of the raking mechanism. Fig. 7 is a rear elevation, with a portion of the platform removed to show internal working parts. Fig. 8 is a side elevation. Fig. 9 is a detail view of a portion of the gavel-delivering apparatus.

Similar letters of reference indicate corresponding parts.

The object of our invention is to provide a rake for harvesters that will deliver the gavels at the rear of the machine in compact form for binding.

Referring to the drawings, A is the platform of the machine, attached to the frame of the running-gear B by means of bars and braces, in the usual way, and is supported at its outer end by the wheel $a$.

C is an extension of the inner end of the platform which supports the journal-boxes of the vertical shaft D.

To the upper end of the shaft D a guide, E, is attached, through which passes a short horizontal shaft carrying guide $b$, that receives the slotted bar F, the sides of which slide between the guides $b$ and the guide E, the latter being in the slot of the said bar.

A cross-bar, G, is attached to the lower end of the slotted bar F, and is provided with arms $c$, that project upward at right angles to the plane of the bars F G. Fingers $d$ project from the bar G, parallel to the line of the slotted bar F.

A bar, H, is journaled in the arms $c$, and to it curved fingers $e$ and a stop or guard, $f$, are attached. This guard serves to limit the motion of the fingers $e$, and also to prevent the grain from moving backward between the arms $c$. Springs $g$ are attached to the bar H and arms $c$, for throwing the curved fingers $e$ up after the gavel is delivered.

I is a curved cam, which is attached to the extension C of the platform, and partly encircles the vertical shaft D, and is provided with stops $h$ and $i$, for limiting the motion of the slotted bar F, and with a notch, $j$, and lug $k$. The slotted bar F rests upon the cam I, and when it is turned with the shaft D it is raised by the said cam.

A lug, $l$, is attached to the under side of the slotted bar F, which engages the inner surface of the cam I, and prevents the slotted bar from sliding as it is turned on its shaft. A beveled lug, $m$, is attached to the upper side of the slotted bar to receive a loop or catch, $n$, which is pivoted to the guide $b$.

An arrow-headed latch, $p$, is hinged to the vertical shaft D, and is capable of dropping behind the lug $k$, when the bar F is parallel with the platform.

A finger, $q$, is attached to the stop $i$, for disengaging the catch $n$ from the lug $m$. An arm, $r$, is attached to the guide E, and a rope or chain, $t$, passes through a hole, $s$, in the said arm, and through a hole in the shaft D, and is attached to the upper end of the slotted bar F. A rope or chain, J, is attached to the guard $f$, and runs through the slot of the bar F, and against a pulley, $u$, that turns on a stud projecting upward from a bracket, $v$, that is attached to the shaft D. A guard is placed around the pulley $u$ to prevent the rope or chain J from leaving the pulley.

K is a chain-wheel placed on the axle M of the running gear, for driving the raking mechanism hereafter described.

In the sides of the chain-wheel angular recesses are made for receiving the lugs $w$ of the grooved wheels L L'. These wheels are placed loosely on the axle M, and are provided with grooved hubs, which receive the ends of the clutch-levers N N', which are pivoted at $a'$, and connected at their upper ends by the rod $b'$.

A hand-lever, O, is connected with the lever N'.

P is a brake-lever, that is pressed down upon the wheel L' by a screw, P'.

Rings $c'$ are placed in the ropes or chains J $t$, that strike eyes $d'$, through which the ropes pass when the slotted bar F is at the end of its stroke.

A bar, $e'$, having fingers $f'$, is pivoted in a recess in the platform, and is provided with a spring, $g'$, that holds the fingers in a vertical position, excepting when a gavel is being drawn from the platform, when it yields and permits the gavel to pass.

A' A' are ratchet-bars attached to cross-bars B¹ B², which are bored to receive rods C', upon which they slide. The rods C' are secured in blocks h', that are placed upon adjusting-screws i', that are journaled in the ends of the platform, and are provided with squared heads, by which they may be turned.

Rubber buffer-springs j' are placed on the outer ends of the rods C', and a spiral spring, k', is placed on each of the said rods, one end of which is attached to the rod at l', and the other end is attached to the cross-bar B².

The platform A is slotted, and the teeth m' of the ratchet-bars A' project upward through the slots to carry the grain forward toward the delivering apparatus.

D' is a worm or endless screw, whose shaft is journaled in the extension C of the platform, and provided with a chain-wheel, E', that is driven by a chain, n', from the wheel K.

F' is a rod jointed to the bar B², having a lug, o', for engaging the thread of the worm D', and a triangular projection, p', on its lower side, which is engaged by a cam, q', and by a triangular block, r', at the outer end of the box s', which is placed in the extension C, parallel with the worm D'.

t' is a spring attached to the side of the box s', that bears against the rod F' and throws it against the worm D'.

The operation of the machine is as follows: Supposing the teeth d of the delivering apparatus to be at rest on the platform, as the machine moves forward the worm D' is rotated by the chain n', and the rod F', whose lug o' is engaged by the thread of the worm, is drawn forward, carrying the ratchet-bars A', the teeth of which move the grain upon the platform toward the delivering apparatus.

When the rod F' nears the end of its stroke the triangular projection p' strikes the triangular block r', and draws the lug o' from the thread of the worm. The springs k' return the bars B¹ B², ratchet-bar A', and the rod F', and the projection p', by passing behind the cam q', prevents the re-engagement of the lug o' with the threads of the worm D' until the said projection passes the square end of the cam, and the rod F' is thrown over by the spring t'. The rod F' is guided, as it is moved by the worm, by the projection p', which moves along the inner or straight portion of the cam q'.

The reciprocating motion of the ratchet-bars is continuous, and when a sufficient quantity of grain is carried into the fingers of the delivering apparatus the lever O is moved so as to bring the wheel L or L' into engagement with the wheel K. This draws the rope J, which first closes the fingers e, down on the gavel. It then draws the fingers containing the gavel backward until the lug l on the bar F slides through the slot j, and the latch p is raised by the bar G, and the catch n engages the lug m. The continued drawing of the rope J turns the bar F and vertical shaft D through a quarter of a revolution, the bar F following the edge of the cam I until it comes into the position shown in Fig. 8.

To insure the closing of the fingers e a slight pressure is exerted on the brake P, and when it is desired to drop the gavel the wheel L is disengaged by moving the lever O, when the springs g thrown up the fingers, and the gavel slips from the fingers d.

When the gavel is drawn from the platform the fingers f' fold down, and allow it to pass, but afterward spring up and prevent the escape of loose grain.

The teeth d are returned to their position on the platform by moving the lever O, so as to bring the wheel L' into engagement with the wheel K. The rope J t, being drawn, turns the bar F and shaft D until the said bar strikes the stop i, and the catch n is disengaged from the lug m by striking the finger q, and the latch p drops behind the lug k. The bar F and fingers d e are thrown forward into the position shown in Fig. 7 by the continued drawing of the rope.

The catch n is designed to take the strain from the inner face of the cam as the bar F is turned.

The lugs w of the wheels L L' are beveled, so that they slip out of the recesses in the wheel K when an undue strain comes upon the ropes.

Having thus described our invention, we claim as new and desire to secure by Letters Patent—

1. The pivoted slide-bar F, having cross-bar G, and pivoted in the arms thereof, a spring-bar, H, said bars being provided with fingers and guard, constructed and arranged as shown and described.

2. The slotted sliding bar F, fingers d e, guides E b, arm r, ropes J t, shaft D, pulley u, and cam I, in combination, substantially as herein shown and described.

3. The combination of the bar F, catch n, lug m, and finger q, substantially as herein shown and described.

4. The latch p, in combination with the cam I and bar F, substantially as herein shown and described.

5. The lever P and screw P', arranged in connection with the wheel L', substantially as and for the purpose specified.

6. The combination of the worm D', rod F', having the lug o' and projection p', the triangular block r', cam q', and spring t, substantially as herein shown and described.

7. The combination of the ratchet-bars A', rods C', springs K', rod F', and worm D', substantially as herein shown and described.

ISAAC N. CHERRY.
ROBERT N. CHERRY.

Witnesses:
WALTER ENGLAND,
JAMES GRAY.